United States Patent
Agarwal et al.

(10) Patent No.: US 8,819,679 B2
(45) Date of Patent: Aug. 26, 2014

(54) METHODS AND SYSTEMS FOR ON-BOARDING APPLICATIONS TO A CLOUD

(75) Inventors: Vikas Agarwal, Noida (IN); Michael Edward Alexander, Great Falls, VA (US); Rema Ananthanarayanan, New Delhi (IN); Sunil Goyal, Haryana (IN); Sumit Mittal, Uttar Pradesh (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 13/192,678

(22) Filed: Jul. 28, 2011

(65) Prior Publication Data

US 2013/0031546 A1 Jan. 31, 2013

(51) Int. Cl.
*G06F 9/46* (2006.01)
*G06F 9/455* (2006.01)
*G06F 9/445* (2006.01)

(52) U.S. Cl.
USPC ............... 718/1; 718/104; 717/176; 717/177

(58) Field of Classification Search
None
See application file for complete search history.

(56) References Cited

U.S. PATENT DOCUMENTS

| | | | |
|---|---|---|---|
| 2008/0127169 A1* | 5/2008 | Malasky et al. | 717/174 |
| 2008/0127348 A1* | 5/2008 | Largman et al. | 726/24 |
| 2009/0300635 A1* | 12/2009 | Ferris | 718/104 |
| 2009/0313620 A1* | 12/2009 | Sedukhin et al. | 718/1 |
| 2010/0076863 A1 | 3/2010 | Golomb | |
| 2010/0077449 A1 | 3/2010 | Kwok et al. | |
| 2010/0106812 A1 | 4/2010 | Bernabeu-Auban et al. | |
| 2010/0131624 A1 | 5/2010 | Ferris | |
| 2011/0016214 A1 | 1/2011 | Jackson | |
| 2011/0072505 A1* | 3/2011 | Ott | 726/11 |
| 2011/0296391 A1* | 12/2011 | Gass et al. | 717/168 |
| 2011/0321033 A1* | 12/2011 | Kelkar et al. | 717/174 |
| 2012/0030672 A1* | 2/2012 | Zygmuntowicz et al. | 718/1 |
| 2012/0131567 A1* | 5/2012 | Barros et al. | 717/170 |
| 2012/0303476 A1* | 11/2012 | Krzyzanowski et al. | 705/26.5 |

\* cited by examiner

*Primary Examiner* — Abdullah Al Kawsar (74) *Attorney, Agent, or Firm* — Ference & Associates LLC (57) ABSTRACT

Methods and arrangements for on-boarding an application to a cloud. An application for hosting in a cloud environment is provided. Metadata related to the application is provided, and metadata related to the cloud is obtained. The application metadata and cloud metadata are compared, and the compatibility of the application with existing offerings of the cloud is ascertained. The application is on-boarded to the cloud.

8 Claims, 7 Drawing Sheets

FIG. 1

```
<cloud>
    <functional>
        <iaasLayer>
            <platform> ,,, </platform>
        </iaasLayer>
        <saasLayer> </saasLayer>
            <softwareStack> ... </softwareStack>
        <appsLayer>
            <application> ... </application>
        </appsLayer>
        <backendServices></backendServices>
    </functional>
    <non-functional>
        <performance> </performance>
        <security>
        </security>
        <tenancyInfo>
        </tenancyInfo>
        <otherTermsandConditions>
        </otherTermsandConditions>
    </non-functional>
</cloud>
```

```
<service>
    <serviceDescription>
        <serviceType> ... </serviceType>
        <provider> ... </provider>
        <encryptionInfo> ... </encryptionInfo>
        <price> ... </price>
        <previewImages> ... </previewImages>
    </serviceDescription>
    <infrastructure> ... </infrastructure>
    <softwareRequired> ... </softwareRequired>
    <networkRequirements> ... </networkRequirements>
    <applicationSetup> ... </applicationSetup>
    <specificToSetupTime>
        <testEnv> ... </testEnv> <!-- in terms of nbr of users, simultaneous users etc .. -->
    </specificToSetupTime>
    <productionTime>
    </productionTime>
    <specificToApplicationExecution>
    </specificToApplicationExecution>
</service>
```

METHODS AND SYSTEMS FOR ON-BOARDING APPLICATIONS TO A CLOUD

BACKGROUND

Generally, the cloud, or cloud network, has grown significantly in its reach, importance and applicability and users of different types are continually entering the greater cloud hosting space. Among these newer participants are telecom operators, for instance. While all participants, both established and newer, are eager to host many applications from different application and service vendors on the cloud, challenges have been encountered in the process of on-boarding new applications (or "apps") to the cloud. At best, smaller component steps of such a process are undertaken but a more efficient and comprehensive process from end-to-end has hitherto been elusive.

BRIEF SUMMARY

In summary, one aspect of the invention provides: providing an application for hosting in a cloud environment; providing metadata related to the application; obtaining metadata related to the cloud; comparing the application metadata and cloud metadata; ascertaining the compatibility of the application with existing offerings of the cloud; and on-boarding the application to the cloud.

Another aspect of the invention provides an apparatus comprising: at least one processor; and a computer readable storage medium having computer readable program code embodied therewith and executable by the at least one processor, the computer readable program code comprising: computer readable program code configured to provide an application for hosting in a cloud environment; computer readable program code is configured to provide metadata related to the application; computer readable program code is configured to obtain metadata related to the cloud; computer readable program code is configured to compare the application metadata and cloud metadata; computer readable program code is configured to ascertain the compatibility of the application with existing offerings of the cloud; and computer readable program code is configured to on-board the application to the cloud.

An additional aspect of the invention provides a computer program product comprising: a computer readable storage medium having computer readable program code embodied therewith, the computer readable program code comprising: computer readable program code configured to provide an application for hosting in a cloud environment; computer readable program code is configured to provide metadata related to the application; computer readable program code is configured to obtain metadata related to the cloud; computer readable program code is configured to compare the application metadata and cloud metadata; computer readable program code is configured to ascertain the compatibility of the application with existing offerings of the cloud; and computer readable program code is configured to on-board the application to the cloud.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
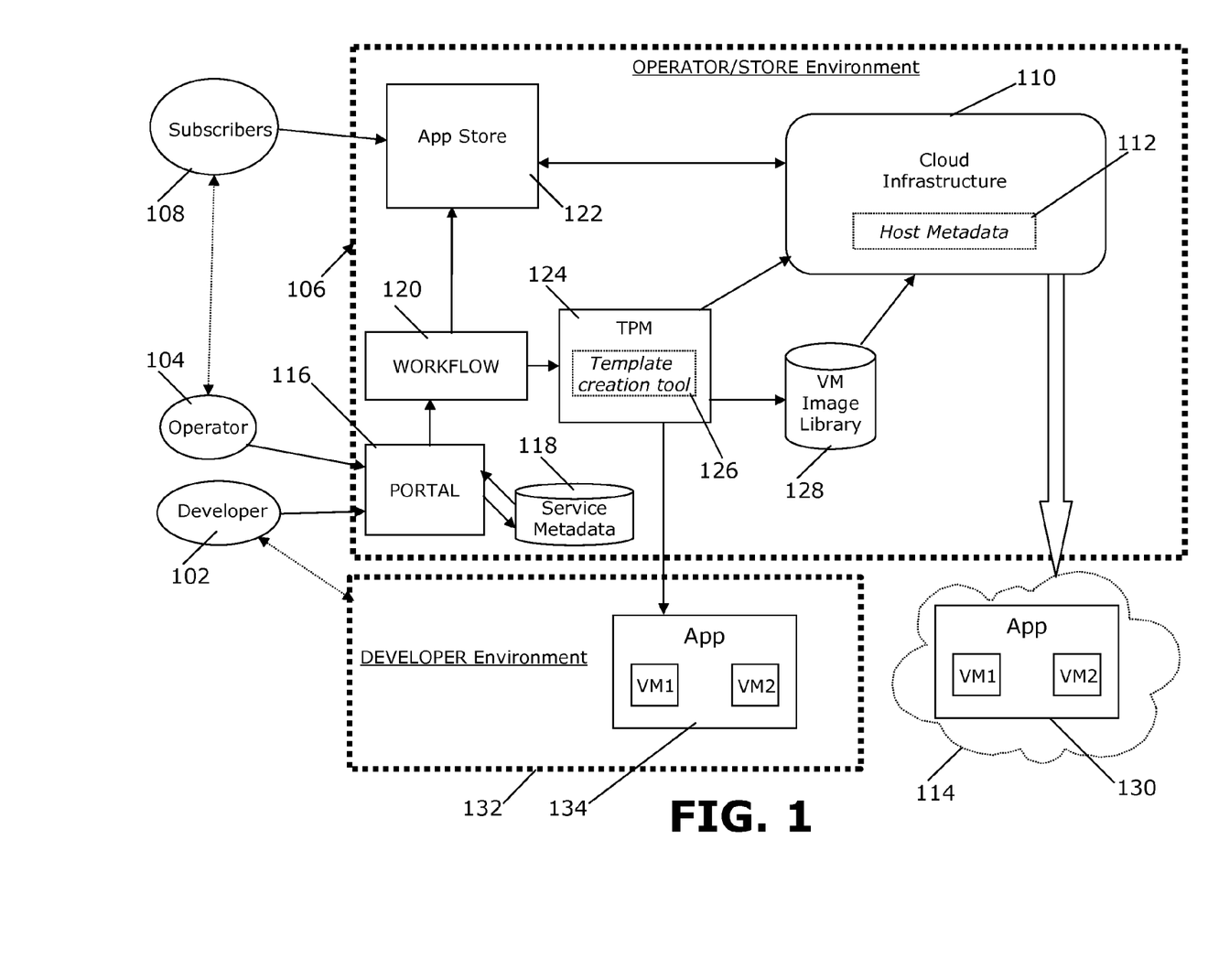
FIG. 1 schematically illustrates an arrangement for on-boarding an application to a cloud.
Figure 2:
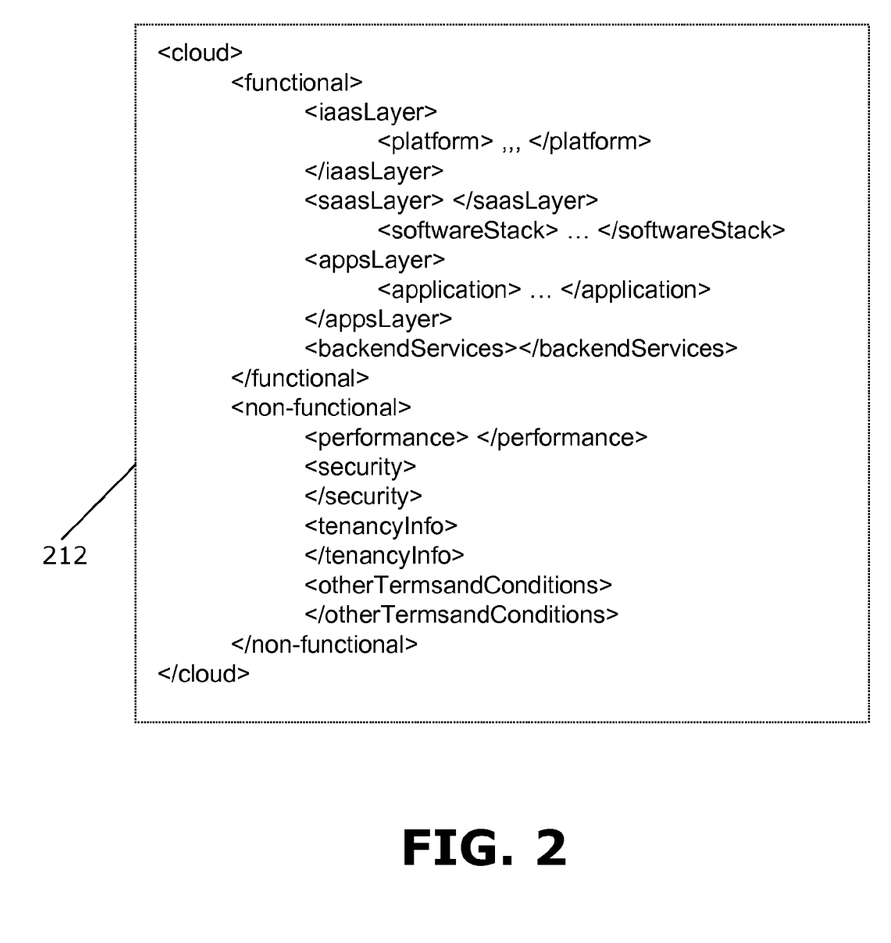
FIG. 2 sets forth an example of cloud-side metadata.
Figure 3:
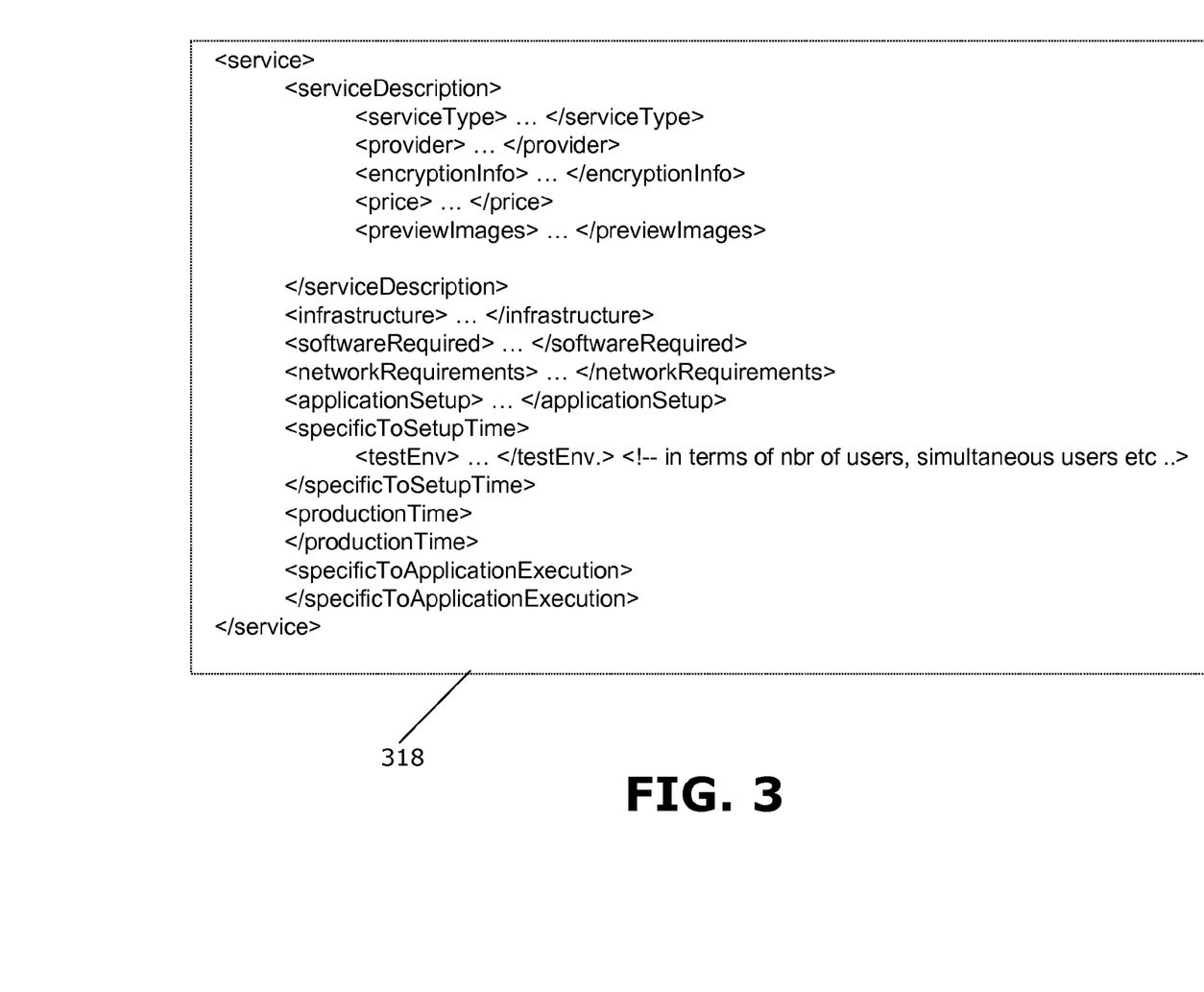
FIG. 3 sets forth an example of service-side metadata.

The disclosure now turns to FIGS. 1-3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 5. In accordance with an example embodiment, most if not all of the process steps, components and outputs discussed with respect to FIGS. 1-3 can be performed or utilized by way of a processing unit or units and system memory such as those indicated, respectively, at 16 and 28 in FIG. 5, whether on a server computer, a client computer, a node computer in a distributed network, or any combination thereof.

To facilitate easier reference, in advancing from FIG. 1 to and through FIG. 3, a reference numeral is advanced by a multiple of 100 in indicating a substantially similar or analogous component or element with respect to at least one component or element found in at least one earlier figure among FIGS. 1-3.

In accordance with at least one embodiment of the invention, there are broadly contemplated herein systems and methods for on-boarding new applications to the cloud in a way to significantly shorten associated cycle times and thus accord efficiencies of benefit to all participants involved. Solutions, as broadly contemplated herein, can be replicated across replicated across different domains (e.g., telecom, media and others) and, in offering an end-to-end process, also facilitate the optional automation of several steps.

Broadly contemplated herein, in accordance with at least one embodiment of the invention, are solutions which provide a standard representation of the services offered, from the cloud point of view and from the application point of view. Also optionally provided is a standard representation of various attributes of end-user requirements. Components are brought together from multiple domains, such as virtualization, end-application, storage, and hosting on the cloud, while a provision is provided for matching host metadata with guest metadata in a way to yield an end-to-end application on-boarding process that presents significant efficiencies compared to conventional piecemeal efforts.

Reference can now be made to FIG. 1, which schematically illustrates an arrangement for on-boarding an application to a cloud in accordance with at least one embodiment of the invention. As shown, an application developer 102 and operator 104 (e.g., a telecom operator) interact with an operator/store environment 106, with which subscribers 108 (e.g., telecom or internet) can also interact by way of browsing, buying or running applications. Generally, the application developer 102 defines the metadata required for the service, while the operator 104 complements this by providing the additional requirements for the service to be executed, in terms of the actual program or executables that are needed to render the service or application.

In the present illustrative and non-restrictive example, in accordance with at least one embodiment of the invention, an on-boarding process and arrangement provides a representation that captures relevant details about what the cloud offers for hosting, or host metadata. Cloud infrastructure 110 resident in the operator/store environment can host or house this host metadata 112, or at least provide ready access to the same as hosted in the cloud 114 itself. For instance, such host metadata can include: default offerings (e.g., relating to hardware, software and applications); payment or subscription terms; other terms and conditions for hosting an application. An illustrative and non-restrictive example of how such metadata can appear is indicated in FIG. 2 at 212.

In accordance with at least one embodiment of the invention, developer 102 and operator 104 alike interact with a portal 116 of operator/store environment 106. Developer 102 provides a representation with relevant details of an application desired to be on-boarded to and hosted on cloud 114. Such details, for the purpose of running the application, can be referred to as guest or service metadata 118, can be stored in operator/store environment 106, and can include: required infrastructure; required platforms; required middleware or other application stack; and any other requirements for running the application. An illustrative and non-restrictive example of how such metadata can appear is indicated in FIG. 3 at 318.

In accordance with at least one embodiment of the invention, after with the host (112) and guest/service (118) metadata on hand, and in a manner now to be better appreciated, an algorithm is defined or provided via workflow 120 that ascertains whether the two are compatible, in terms of what the cloud 114 provides as compared to what the application requires. An outline of the algorithm is then provided. (Other types of comparison or negotiation could be employed as an alternative to an algorithm.) In a general sense, such an algorithm could work by comparing each of the attributes or requirements that feature in the metadata. Thus for each attribute, the algorithm would essentially check as to whether offerings of the cloud 114 cover the range required by the service or application in question. (For instance, for a service that requires 2 GB of RAM, as specified in service metadata, the algorithm would ascertain as to whether there is an offering from cloud 114 that provides at least 2 GB of RAM. This can be generalized by specifying a range of values required for each attribute, and ensuring that the offering that is suggested does span the required range. The algorithm can cover other aspects, as well, such as features and ranges of values as might be mandated by the application metadata, or features and ranges of values that may be desirable but not essential.) There may also be considered any requirements that a subscriber 108, i.e, an end-user of the application may have him/herself, as he/she may wish to specify, when instantiating a request on the cloud (e.g., through an app store 122 hosted by the operator/store environment 106). Thus, such requirements may also be captured by the guest/service metadata 118 and thereupon be used to instantiate the application, to the extent that the end-application permits such flexibility.

In accordance with at least one embodiment of the invention, as shown in FIG. 1, an application 130 is deployed to the cloud 114, and may incorporate or make use of at least one virtual machine (VM), indicated here as "VM1" and "VM2". The discussion now turns to different manners via which the app 130 can be so deployed, depending on the compatibility of an app with offerings of the cloud 114 based on a comparison of the host and service metadata 112/118. Accordingly, when it is desired to on-board a new application to the cloud 114, a check is first made (e.g., via the aforementioned algorithm) as to whether the requirements of the application of developer 102 map directly to some offering available from the cloud 114. If yes, the offering is then mapped to the new application; this offering could be PaaS, IaaS and or AppaaS (Platform as a Service, Infrastructure as a Service, Application as a Service). If no, a check is made as to whether a new offering can be defined on the cloud based on other offerings available on the cloud.

In accordance with at least one embodiment of the invention, failing the above, a check is then made, via a provisioning manager 124 (such as a Tivoli Provisioning Manager

[TPM] as developed by IBM of Armonk, N.Y.) as to whether a template creation tool 126 (such as the BlueHorse tool developed by IBM) can be used to create a template of the application and thereupon host it on the cloud 114. (It should be understood that a TPM and BlueHorse tool are presented here as illustrative and non-restrictive examples of a provisioning manager and template creation tool, respectively.) In accordance with at least one embodiment of the invention, if the aforementioned template creation step is possible, then the template of the application 134 can be added as a catalog entry (and thus hosted on the cloud 114). If not, then a check is made as to whether it is manually possible to load the application on a VM on the cloud 114, by consulting a VM image library 128, and thereafter publish how the application may be accessed. (By way of illustrative and non-restrictive examples, both a Tivoli Provisioning Manager and Tivoli Service Automation Manager, as developed by IBM, allow a user to provision VM's so as to then be able to install applications on the VM's.) If a new application is being set up from scratch, manual steps may also be employed to host the application on infrastructure on the cloud. In other words, when it is not possible to on-board the application automatically at the time of a user request, the administrator may provision the required infrastructure from cloud 114, and then host the application on the provisioned infrastructure manually.

Generally, in accordance with at least one embodiment of the invention, a check is made for other back-end services that would need to be integrated with the application 134, such as metering, billing, monitoring and availability. (Such services can be offered by the cloud 114 as constituent components of features offered by the cloud 114, and can be common across different applications.) Finally, the cloud offering (if any) is published at the app store 122.

In accordance with at least one embodiment of the invention, the following can be included in a representation of what the cloud can host: hardware platforms it can provide (e.g., operating system, CPU/Memory/Hard disk); software stacks it can provide (e.g., middleware, applications); applications it can provide or provision (e.g., solutions such as a template creation tool [e.g., BlueHorse] that can be employed to capture images of existing running applications); services it can provide; workflows that may be provisioned (which may be relevant to see if a new offering may be composed of existing workflows); non-functional requirements provided by the cloud (e.g., performance, security); and administrative requirements (e.g., integration with billing and other services). These elements, many of which can be found in a catalog (e.g., which is provided for the cloud 114 and lists cloud offerings) are provided by way of illustrative and non-restrictive example, and the above list is certainly not intended to be exhaustive.

In accordance with at least one embodiment of the invention, the following can be included in a representation of what an application would need and/or what an end-user might need from the application: hardware stack; software stack; services stack; network requirements; and non-functional requirements (e.g., availability, response time, cost). These elements are provided by way of illustrative and non-restrictive example, and the above list is certainly not intended to be exhaustive.

In accordance with at least one variant embodiment of the invention, applications in a wide number of domains could be covered (e.g., mobile, consumer electronics others). In another alternative, one of a plurality of cloud services could be selected for provisioning the application, whereby the cloud or cloud model (e.g., public, private, hybrid) that provides a best fit could be sought.

Figure 4:
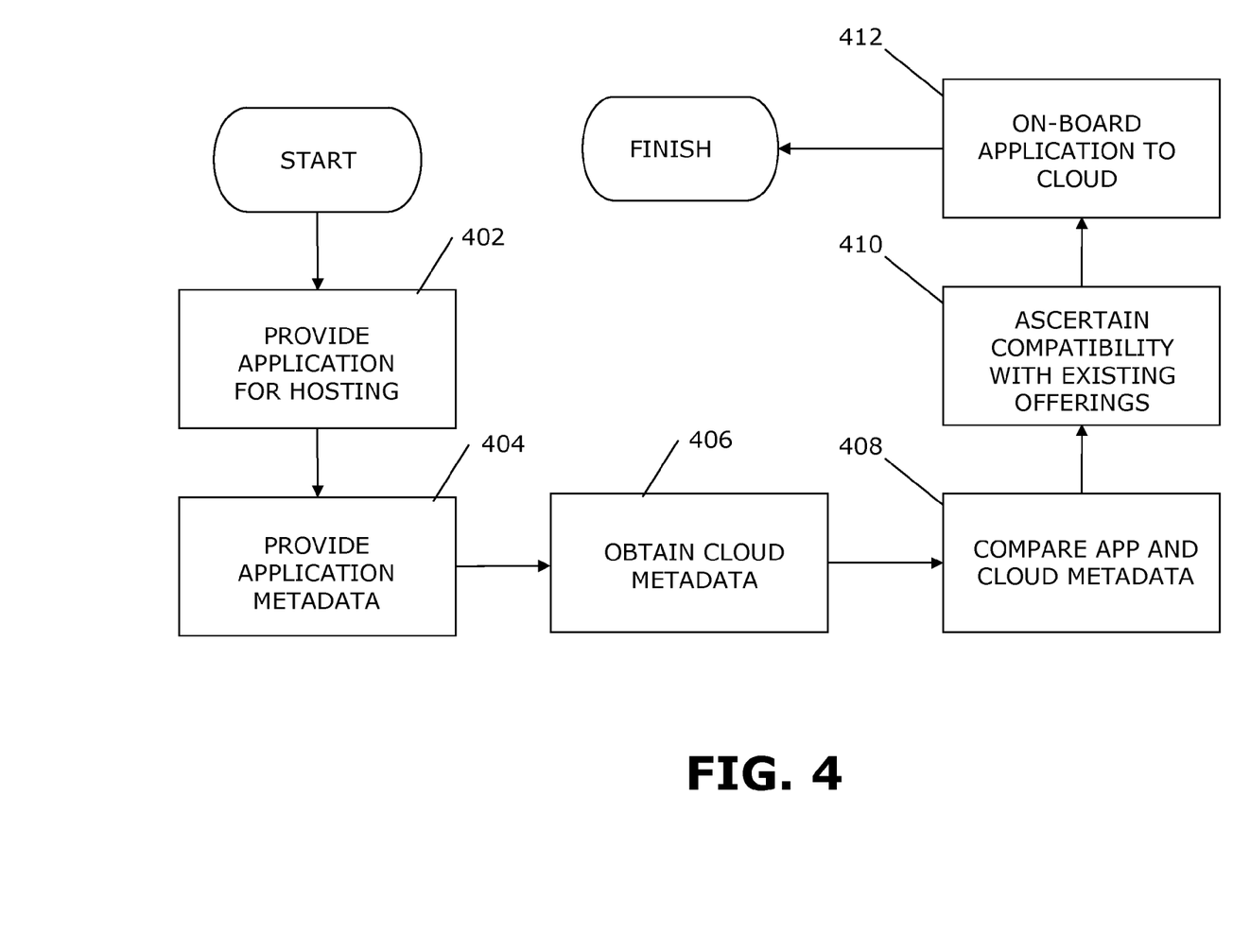
FIG. 4 sets forth a process more generally for on-boarding an application to a cloud.

FIG. 4 sets forth a process more generally for on-boarding an application to a cloud, in accordance with at least one embodiment of the invention. It should be appreciated that a process such as that broadly illustrated in FIG. 4 can be carried out on essentially any suitable computer system or set of computer systems, which may, by way of an illustrative and on-restrictive example, include a system such as that indicated at 12 in FIG. 5. In accordance with an example embodiment, most if not all of the process steps discussed with respect to FIG. 4 can be performed by way a processing unit or units and system memory such as those indicated, respectively, at 16 and 28 in FIG. 5.

As shown in FIG. 4, an application for hosting in a cloud environment is provided (402). Metadata related to the application is provided (404), and metadata related to the cloud is obtained (406). The application metadata and cloud metadata are compared (408), and the compatibility of the application with existing offerings of the cloud is ascertained (410). The application is on-boarded to the cloud (412).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 5:
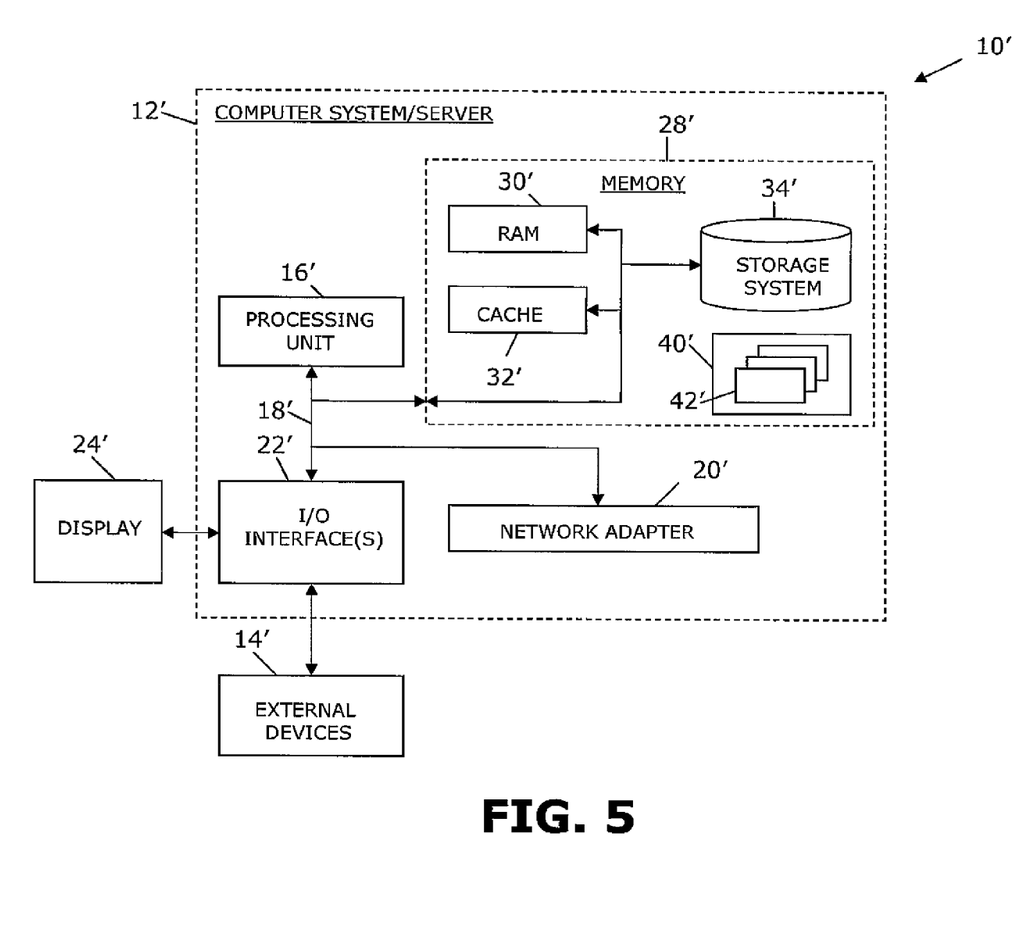
FIG. 5 depicts a cloud computing node.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove.

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10' is shown in the form of a general-purpose computing device. The components of computer system/server 12' may include, but are not limited to, one or more processors or processing units 16', a system memory 28', and a bus 18' that couples various system components including system memory 28' to processor 16'.

Bus 18' represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by one or more data media interfaces. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, one or more application programs, other program modules, and program data. Each of the operating system, one or more application programs, other program modules, and program data or some combination thereof, may include an implementation of a networking environment. Program modules 42' generally carry out the functions and/or methodologies of embodiments of the invention as described herein.

Computer system/server 12' may also communicate with one or more external devices 14' such as a keyboard, a pointing device, a display 24', etc.; one or more devices that enable a user to interact with computer system/server 12; and/or any devices (e.g., network card, modem, etc.) that enable computer system/server 12' to communicate with one or more other computing devices. Such communication can occur via Input/Output (I/O) interfaces 22'. Still yet, computer system/server 12' can communicate with one or more networks such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

Figure 6:
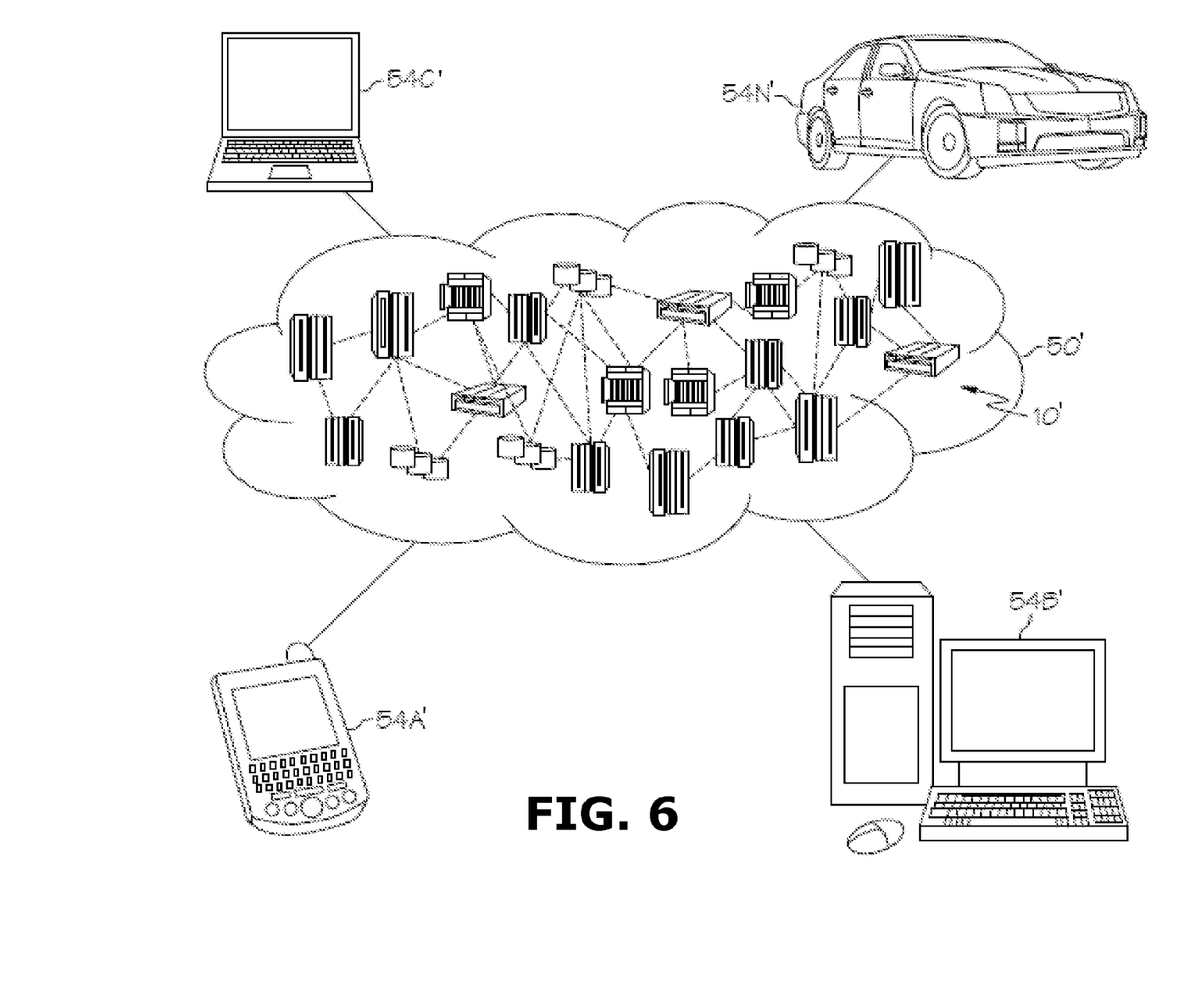
FIG. 6 depicts a cloud computing environment.

Referring now to FIG. 6, illustrative cloud computing environment 50' is depicted. As shown, cloud computing environment 50' comprises one or more cloud computing nodes 10' with which local computing devices used by cloud consumers, such as, for example, personal digital assistant (PDA) or cellular telephone 54A', desktop computer 54B', laptop computer 54C', and/or automobile computer system 54N' may communicate. Nodes 10' may communicate with one another. They may be grouped (not shown) physically or virtually, in one or more networks, such as Private, Community, Public, or Hybrid clouds as described hereinabove, or a combination thereof. This allows cloud computing environment 50' to offer infrastructure, platforms and/or software as services for which a cloud consumer does not need to maintain resources on a local computing device. It is understood that the types of computing devices 54A'-N' shown in FIG. 6 are intended to be illustrative only and that computing nodes 10' and cloud computing environment 50' can communicate with any type of computerized device over any type of network and/or network addressable connection (e.g., using a web browser).

Figure 7:
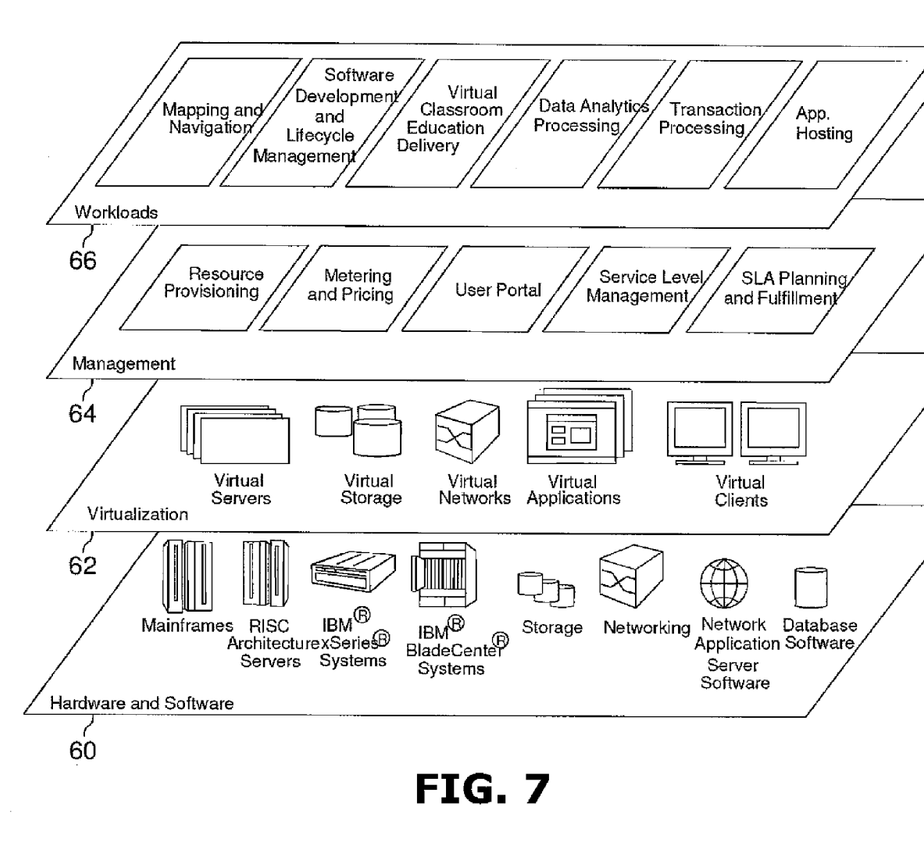
FIG. 7 depicts abstraction model layers.

Referring now to FIG. 7, a set of functional abstraction layers provided by cloud computing environment 50' (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60' includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62' provides an abstraction layer from which the following examples of virtual entities may be provided: virtual servers; virtual storage; virtual networks, including virtual private networks; virtual applications and operating systems; and virtual clients.

In one example, management layer 64' may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66' provides examples of functionality for which the cloud computing environment may be utilized. Examples of workloads and functions which may be provided from this layer include: mapping and navigation; software development and lifecycle management; virtual classroom education delivery; data analytics processing; transaction processing; and application hosting.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:

at least one processor; and a computer readable storage medium having computer readable program code embodied therewith and executable by the at least one processor, the computer readable program code comprising:

computer readable program code configured to provide an application for hosting in a cloud environment;

computer readable program code configured to provide metadata related to the application;

computer readable program code configured to obtain metadata related to the cloud;

computer readable program code configured to compare the application metadata and cloud metadata;

computer readable program code configured to ascertain the compatibility of the application with an existing offering of the cloud; and computer readable program code configured to on-board the application to the cloud via performing the following:

(a) determining whether the application matches an existing offering of the cloud and, if so, mapping the existing offering to the application;

if (a) does not apply: (b) ascertaining whether a new offering can be defined on the cloud and, if so, deploying the application to the cloud;

if (b) does not apply: (c) ascertaining whether a template creation tool can create a template of the application for being hosted on the cloud and, if so, hosting the template of the application on the cloud; and if (c) does not apply: (d) ascertaining whether it is possible to load the application on a virtual machine on the cloud and, if so, loading the application on a virtual machine on the cloud.

2. A computer program product comprising:

a non-transitory computer readable storage medium having computer readable program code embodied therewith, the computer readable program code comprising:

computer readable program code configured to provide an application for hosting in a cloud environment;

computer readable program code configured to provide metadata related to the application;

computer readable program code configured to obtain metadata related to the cloud;

computer readable program code configured to compare the application metadata and cloud metadata;

computer readable program code configured to ascertain the compatibility of the application with an existing offering of the cloud; and computer readable program code configured to on-board the application to the cloud via performing the following:

(a) determining whether the application matches an existing offering of the cloud and, if so, mapping the existing offering to the application;

if (a) does not apply: (b) ascertaining whether a new offering can be defined on the cloud and, if so, deploying the application to the cloud;

if (b) does not apply: (c) ascertaining whether a template creation tool can create a template of the application for being hosted on the cloud and, if so, hosting the template of the application on the cloud; and if (c) does not apply: (d) ascertaining whether it is possible to load the application on a virtual machine on the cloud and, if so, loading the application on a virtual machine on the cloud.

3. The computer program product according to claim 2, wherein the application metadata includes end-user requirements.

4. The computer program product according to claim 2, wherein said computer readable program code is further configured to add a template of the application as a catalog entry if a template of the application can be created for being hosted on the cloud.

5. The computer program product according to claim 2, wherein said computer readable program code is configured to ascertain a possibility of loading the application on a virtual machine via ascertaining whether the application can be loaded manually.

6. The computer program product according to claim 2, wherein said computer readable program code is configured to ascertain a possibility of loading the application on a virtual machine via consulting a virtual machine image library.

7. The computer program product according to claim 6, wherein said computer readable program code is configured to publish how the application may be accessed.

8. The method according to claim 2, wherein said computer readable program code is further configured to check the cloud for back-end services to be integrated with the application.

* * * * *